United States Patent [19]

Yoshida et al.

[11] Patent Number: 5,113,268
[45] Date of Patent: May 12, 1992

[54] DUAL OPERATIONAL IMAGE READING APPARATUS

[75] Inventors: Kazuyuki Yoshida; Nobuo Kanai; Toshikazu Suzuki; Masamitsu Ishiyama, all of Osaka, Japan

[73] Assignee: Minolta Camera Kabushiki Kaisha, Osaka, Japan

[21] Appl. No.: 364,000

[22] Filed: Jun. 9, 1989

[30] Foreign Application Priority Data

| Jun. 10, 1988 | [JP] | Japan | 63-144490 |
| Aug. 2, 1988 | [JP] | Japan | 63-193789 |
| Aug. 2, 1988 | [JP] | Japan | 63-193790 |
| Aug. 2, 1988 | [JP] | Japan | 63-193791 |
| Aug. 2, 1988 | [JP] | Japan | 63-193792 |
| Aug. 26, 1988 | [JP] | Japan | 63-213397 |
| Aug. 26, 1988 | [JP] | Japan | 63-213398 |

[51] Int. Cl.$^5$ .................................. H04N 1/04
[52] U.S. Cl. .................. 358/474; 358/494; 358/497; 358/487
[58] Field of Search ......... 358/482, 483, 401, 471, 358/474, 487, 494, 496, 497, 214; 355/18, 19, 21, 46, 48, 50, 56, 232

[56] References Cited

U.S. PATENT DOCUMENTS

| 3,249,007 | 5/1966 | Stauffer | 355/56 |
| 3,322,029 | 5/1967 | Palmquist et al. | 355/56 |
| 3,424,525 | 1/1969 | Towers et al. | 355/232 |
| 3,678,835 | 7/1972 | Takishima | 355/56 |
| 3,728,018 | 4/1973 | Wharton et al. | 355/46 |
| 4,101,373 | 7/1978 | Schiffman | 355/50 |
| 4,415,244 | 11/1983 | Daly et al. | 355/56 |
| 4,462,674 | 7/1984 | Nishikawa | 355/232 |
| 4,557,591 | 12/1985 | Serizawa et al. | 355/56 |
| 4,789,880 | 12/1988 | Mori et al. | 355/56 |
| 4,807,041 | 2/1989 | Kishi et al. | 358/487 |
| 4,866,536 | 9/1989 | Honjo et al. | 358/494 |
| 4,876,568 | 10/1989 | Ozawa et al. | 355/56 |
| 4,991,030 | 2/1991 | Sato et al. | 358/474 |

FOREIGN PATENT DOCUMENTS 59-198439 11/1984 Japan .
63-26640 2/1988 Japan .

*Primary Examiner*—Edward L. Coles, Sr.
*Assistant Examiner*—Thomas D. Lee
*Attorney, Agent, or Firm*—Burns, Doane, Swecker & Mathis

[57] ABSTRACT

An image reading apparatus of the present invention enlarges and reads a small light-permeable document such as a photographic film. In the apparatus of the present invention, an image of a film is divided into strips and is projected on a part of a main-scanning direction of a line image sensor. The film is then moved in a direction corresponding to the main-scanning direction of the line image sensor, thereby reading the image of the whole area of the film.

16 Claims, 13 Drawing Sheets

DUAL OPERATIONAL IMAGE READING APPARATUS

BACKGROUND OF THE INVENTION

1. Field of the Invention

The present invention generally relates to an image reading apparatus for reading an image of a document sheet for use in a copying machine or the like, and more particularly, to an image reading apparatus of the above-described type which is capable of reading also an image of a photographic film.

2. Description of Related Art

Recently, a digital copying apparatus capable of storing and processing informations of an image of a read-out document as an electric signal has been put into practical use.

In such a copying apparatus as referred to above, a normal photographic film, that is, a negative film has easily been polarized into positive, which fact has raised a great demand to directly have a copied object from the photographic film. In Japanese Patent Application Laid-Open No. 59-198439 (1984), there is disclosed one such copying apparatus whereby an enlarged object from a small light-permeable document, for example, a photographic film or the like is obtained. This copying apparatus is of such construction that a projector, a reflecting mirror and the like are additionally provided in a copying machine which exposes a film by scanning a document sheet on a document platen by the use of an optical system. The projector enlarges and projects an image of the film from the lateral side. The projected image is reflected onto the document platen through the reflecting mirror and then read by the optical scanning system.

Although the above-mentioned conventional copying apparatus is capable of enlarging and reading a photographic film, it has disadvantages as will be described below.

The conventional apparatus requires more space for an optical path so as to enlarge and project the image of the film, resulting consequently in a bulky structure of the whole apparatus. When the image of the film is read, since the projected image is read through an unnecessary document platen, efficient illumination can not be obtained because of a loss of a light quantity. Projecting the whole of the image consumes great electricity in a light source. Furthermore, when the image of the film is read, the apparatus necessitates the aforementioned optical members to be mounted on the document platen.

Since illumination of the projected image on the document platen is decreased from the center to the periphery thereof, it is necessary to adjust and compensate the reading part both in a main-scanning direction and in a sub-scanning direction, respectively, in order to obtain uniform illumination.

If the projected image onto the document platen is not exactly focused with respect to the reading part, the image can not read with great accuracy. Heretofore, in order to perform focusing, an operator has moved a reflecting lens of the projector in the direction of an optical axis while watching the projected image. This, however, takes much time and the obtained focus is not necessarily met because it depends on a decision of the operator.

SUMMARY OF THE INVENTION

The foregoing disadvantages of the prior art are overcome by the present invention. An image reading apparatus of the present invention is provided with a reading unit (a line image sensor) which is moved in the subscanning direction of a normal light-impermeable document placed on a document platen, a film holder for holding a film, a mechanism for moving the film holder in order to scan an image of the film, and an optical member for projecting the optical image of the scanned film onto the reading unit. The apparatus in accordance with the present invention is capable of reading both the image of the light-impermeable document and the image of the film in one unit. When the image of the light-impermeable document is to be read, the reading unit is moved in the subscanning direction. When the image of the film is to be read, the film is moved in a direction corresponding to the subscanning direction of the reading unit. At this time, the image of the film is rotated to be incident on the reading unit.

The apparatus of the invention is further provided with a mechanism for automatically focusing the projected image of the film.

The apparatus of the invention is also provided with a mechanism which moves a projector for projecting the image of the film between an operating position in the vicinity of the document platen and a non-operating position which is away from the document platen.

In the apparatus of the invention, the optical members such as a lens and a mirror for use in leading a light of the image of the film to the image sensor are adapted to be housed in a main body thereof.

It is an object of the invention to provide an image reading apparatus which realizes compact structure of the whole apparatus.

It is another object of the invention to provide an image reading apparatus which can be handled with ease.

It is another object of the present invention to provide an image reading apparatus, wherein when the image of the film is read, the film is arranged to be moved without moving the line image sensor, so that a motor for moving the film is enough with low torque, enabling reduction of the power comsumption in the whole apparatus.

It is another object of the invention to provide an image reading apparatus which does not require compensation for uneven illumination in the subscanning direction of the reading unit.

It is another object of the invention to provide an image reading apparatus wherein it is not necessary to enlarge and project the whole image of the film at one time, enabling reduction of the power consumption in a light source.

It is a further object of the invention to provide an image reading apparatus wherein the film is not liable to be damaged or smudged.

It is a further object of the invention to provide an image reading apparatus wherein the film can be moved in a horizontal direction for stable movement thereof.

It is a further object of the invention to provide an image reading apparatus wherein a desired frame of a film piece can be readily selected and read.

It is a further object of the invention to provide an image reading apparatus wherein an operator is not involved in difficulties in focusing the imnage of the film.

It is a further object of the invention to provide an image reading apparatus which ensures precise focusing and accurate reading of the image of the film.

It is a further object of the invention to provide an image reading apparatus wherein each member necessary for reading the image of the film is so positioned as not to hinder the operation of reading the document sheet on the document platen.

It is a further object of the invention to provide an image reading apparatus wherein each member necessary for reading the image of the film is always housed in the main body of the apparatus, without necessities for an extra space to store those members.

The above and further objects and features of the invention will more fully be apparent from the following detailed description with accompanying drawings.

DESCRIPTION OF THE PREFERRED EMBODIMENTS

Figure 1:
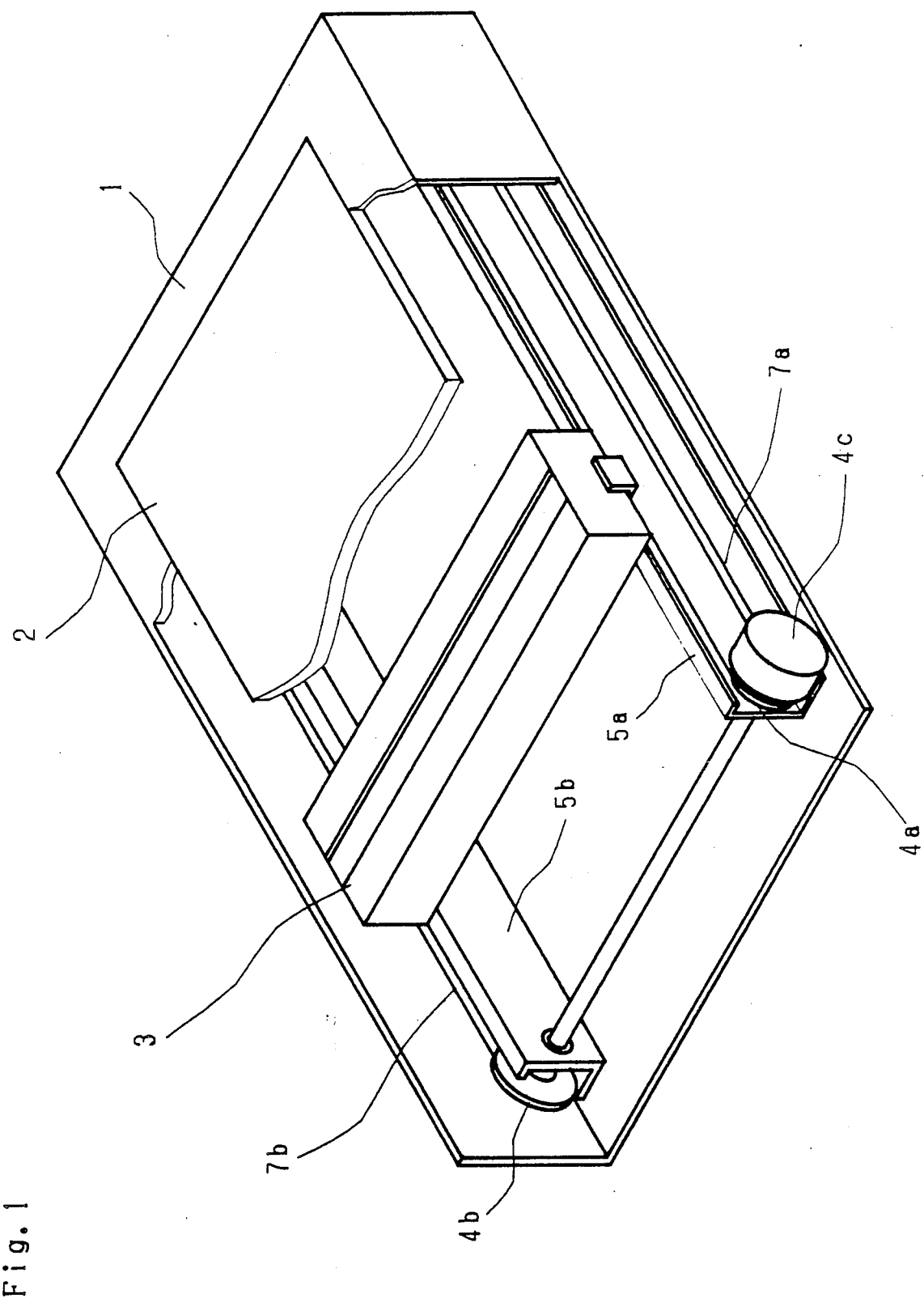
FIG. 1 is a perspective view showing the inner structure of an image reading apparatus of the invention.

One preferred embodiment of an image reading apparatus of the present invention will now be described in detail with reference to the drawings. FIG. 1 is a perspective view showing the inner structure interior of a main body 1 of the image reading apparatus of the invention. There is mounted on the upper surface of the main body 1 a document platen 2 made of a glass plate. In the inside bottom portion of the main body 1 are disposed a pair of opposite rails 5a, 5b extending in a direction equal to the widthwise direction of the main body 1. A reading head 3 in the form of a rectangular parallelepiped is placed over the rails 5a, 5b, in an elongated direction orthogonal to the rails 5a, 5b. As shown in a longitudinal sectional view of FIG. 2, the reading head 3 is provided with a cylindrical light source 31, a reading lens 32 comprising of, e.g., a focusing rod lens, and a line image sensor 33 composed of a plurality of CCDs (charge coupled device) in array. Each of the light source 31, the reading lens 32 and the image sensor 33 has its lengthwise direction equal to the depthwise direction of the reading head 3.

When a general light-impermeable document is to be read, the light source 31 is lit first. An image of the reflected light of the light-impermeable document placed on the document platen 2 enters the image sensor 33 through the reading lens 32. The image sensor 33 performs main-scanning of the document. Through pulleys 4a, 4b provided in the rails 5a, 5b and wires 7a, 7b neatly coiled around the pulleys 4a, 4b, the reading head 3 is moved on the rails 5a, 5b in the widthwise direction of the main body 1. The document sheet is subscanned by this movement. The pulleys 4a, 4b are rotated and driven through a motor 4c, respectively.

Figure 2:
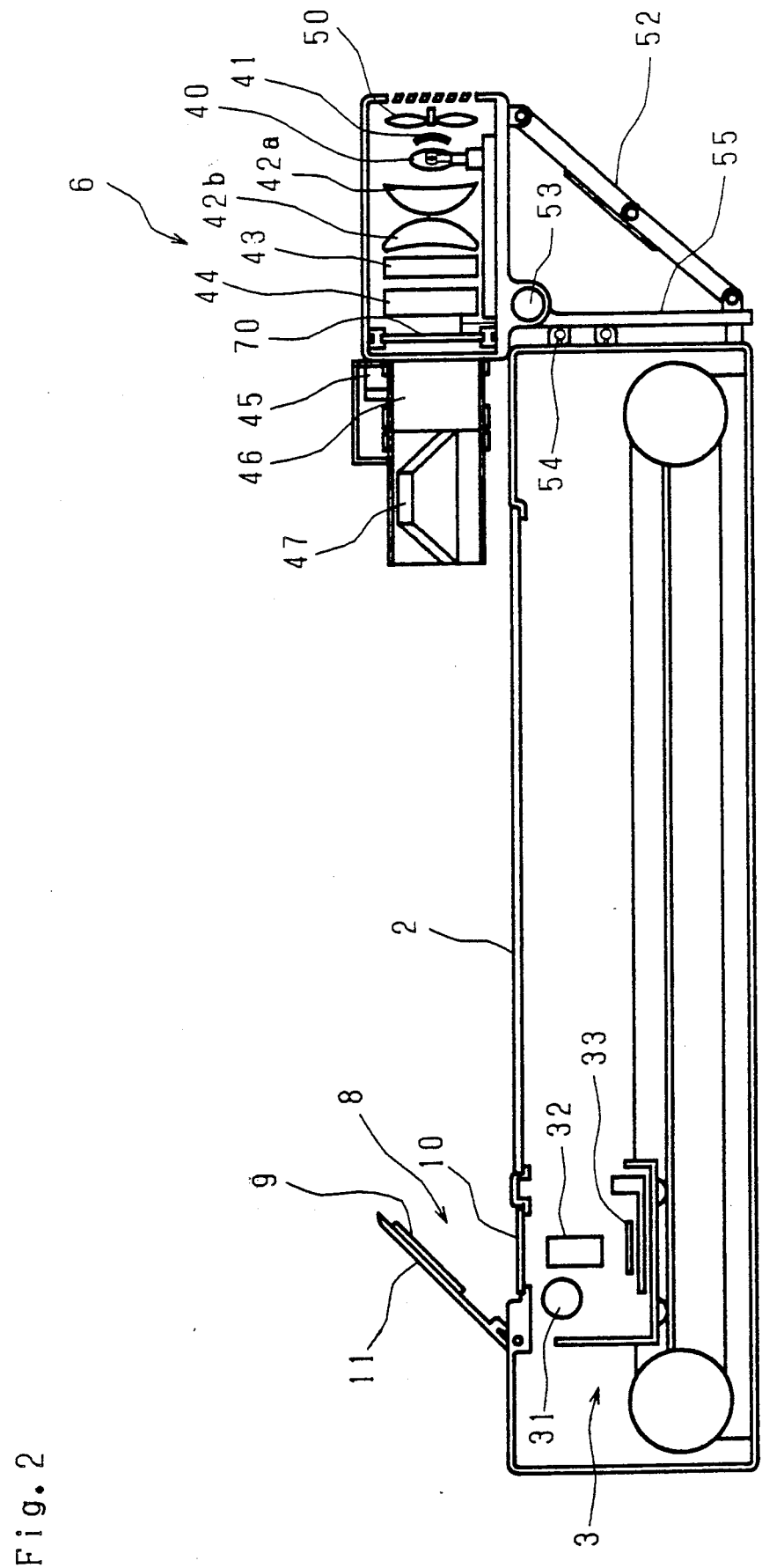
FIG. 2 is a longitudinally sectional view of the image reading apparatus of the invention showing a state that the film is enlarged, projected and read.

FIG. 2 is a longitudinal sectional view showing a state where members to be used when a small light-permeable document such as a photographic film is enlarged and read are installed in the main body 1. Conventionally, the whole image of one frame of the film to be read has been enlarged and projected on the document platen and the projected image has been scanned by moving the reading head. In the apparatus of the invention, however, scanning for reading the whole image is carried out without moving the reading head, but moving the film to be enlarged and projected, so that the projected area with respect to the image sensor is changed.

Figure 3:
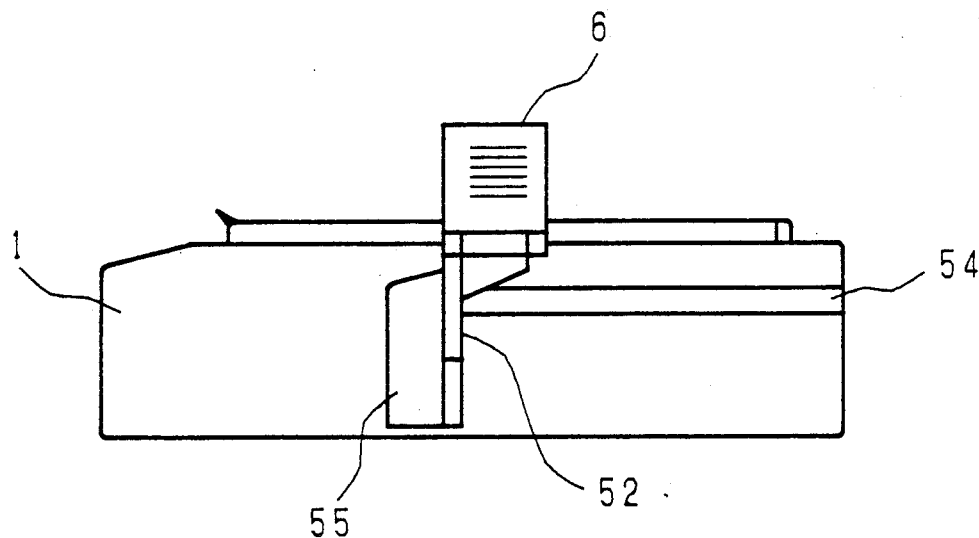
FIG. 3 is a right-side elevational view of FIG. 2.

A projector 6 is mounted substantially in a horizontal direction at a position higher than the upper surface of the right edge of the main body 1. A projecting light of the projector 6 is irradiated to a mirror 9 provided in the left side of the document platen 2. FIG. 3 is a right-side elevational view of the main body 1 which shows the state that the projector 6 is installed in the main body 1. The main body 1 is provided with a slide rail 54 in the right lateral structure thereof. The rail 54 is extended in a direction equal to the depthwise direction of the main body 1. A guide member 55 is slided in the depthwise direction of the main body 1 by the slide rail 54. A shaft 53 is pivotally supported in the upper portion of the guide member 55. The center of gravity in the lower part of the projector 6 is supported by the shaft 53, and therefore the projector 6 is rotatable around the shaft 53. A stopper 52 is disposed between the rear-end portion of the projector 6 and the lower part of the guide member 55. The stopper 52 is composed of two members having substantially the same size, both of which are connected with each other so as to be bendable in therebetween.

Figure 4:
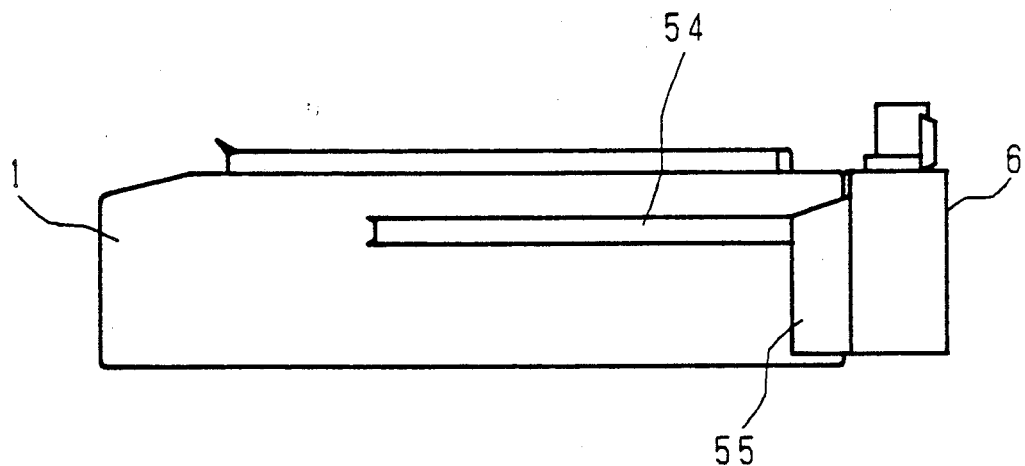
FIG. 4 is a right-side elevational view of the image reading apparatus of the invention showing a state that a projector is retracted.

When each member of the stopper 52 is stretched out, the light-emitting direction from the projector 6 will be horizontal (facing to the left), which allows the film to be projected and moved. On the other hand, when the connected part of the stopper 52 is bent, the projector 6 is rotated by 90 degrees around the shaft 53 so as to be retained with the light-emitting direction thereof being perpendicular (facing to upward) (See FIG. 4). In this state, it is possible to retract the projector 6 as well as the guide member 55 by the slide rail 54 toward the rear part of the main body 1. When a document sheet on the document platen 2 is normally read, the projector 6 is out of the way, not obstructing the operator's work.

As may be seen from the above description, the slide rail 54 is provided in order to retract the projector 6. When the film is to be projected, the projector 6 is fixed at a predetermined position substantially in the middle of the main body 1 in the depthwise direction thereof.

The projector 6 has in its rear part (the right side in FIG. 2) a light source 40. There are arranged condenser lenses 42a, 42b, cylindrical lenses 43, 44, a film holder 70 for holding a film to be projected, a projecting lens 46, and an image-rotating prism 47 in this order from the light source 40 to the front of the apparatus. At the rear of the light source 40, there are arranged a reflecting mirror 41 and a cooling fan 50.

The film holder 70 holds a long film piece which is cut into several frames. The film holder 70 comprises a pressure plate 70a and a base plate 70b both made of a transparent sheet material. The plates 70a, 70b are hinged each other at edge portions of one side thereof so that the film holder 70 can be opened and closed. The base plate 70b is formed with a recess 71 and three bores 72 so as to place and position the film, the thickness and the width of the recess 71 being generally the same as those of the film. The pressure plate 70a in its opposite end portions is provided with three pins 73 to be fitted in the respective bores 72. The pressure plate 70a has at its opposite side ends two patterns 74 formed by streaks for AF (auto focusing), the lengthwise direction of the patterns 74 being the same as the widthwise direction of the pressure plate 70a. The film piece is put in the recess 71, then, when the pressure plate 70a is tightly fitted with the base plate 70b, the film piece is retained in the film holder 70. The film is consequently prevented from being warped, and when the film is projected, the image of the film can be obtained with uniform quality. In addition, the operator's work can be simplified.

Figure 6:
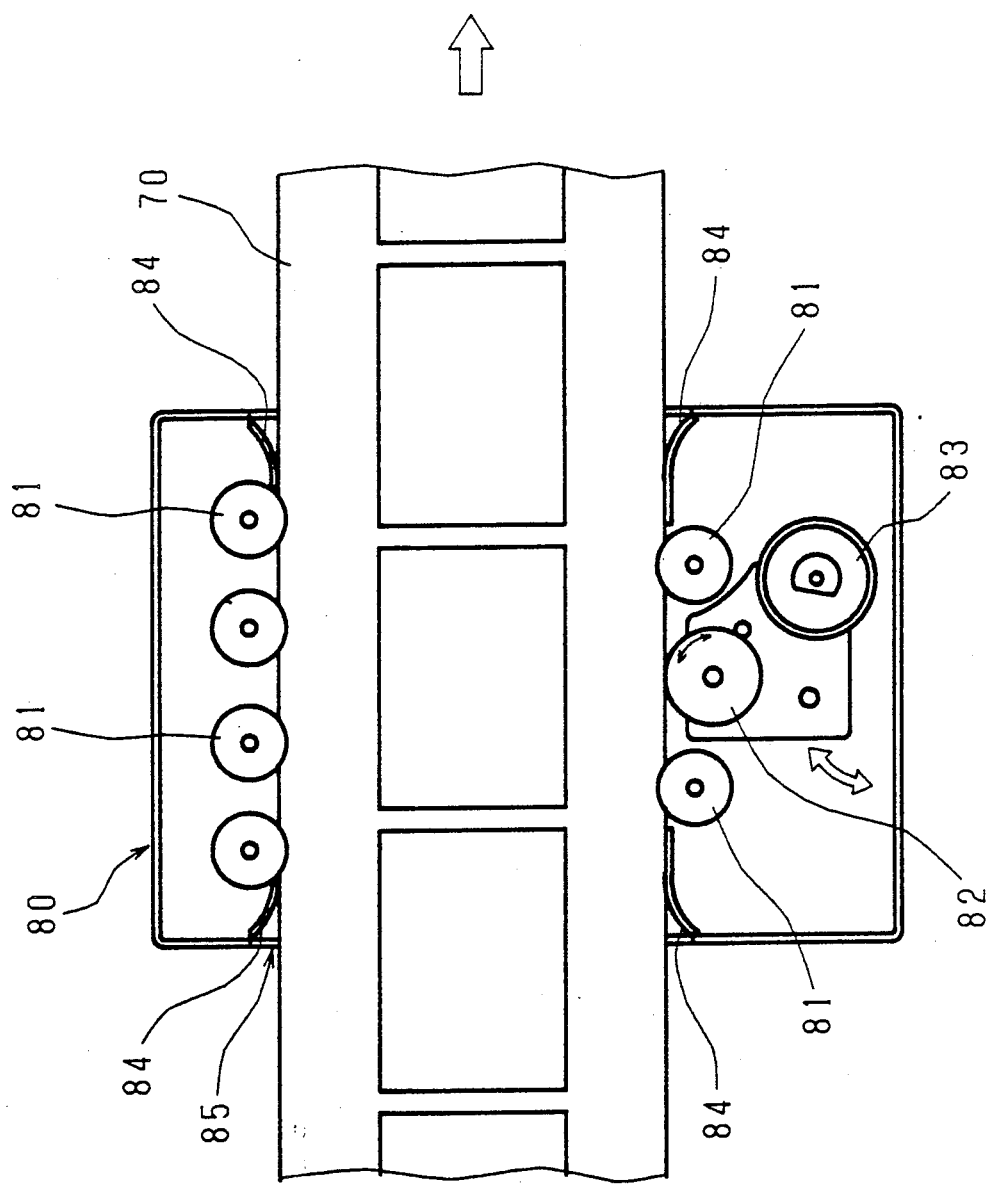
FIG. 6 is a longitudinal sectional view showing a film scanning mechanism.

The film holder 70 is fitted into the projector 6 after the lengthwise direction of the film holder 70 (the film piece) is made coincident with the depthwise direction of the main body 1. The film holder 70 is movable in the horizontal direction, namely, in the direction at right angles to the drawing of FIG. 2. A film scanning mechanism 80 for moving the film holder 70 will now be described with reference to FIG. 6. The mechanism 80 is provided with a flat rectangular guide-bore 85 which goes through the projector 6. The film holder 70 is inserted in and moved through the guide-bore 85 while the film is directed in its widthwise direction vertical to the holder. Each pair of film holder guides 84 for guiding the film holder 70 is disposed in the upper and lower parts in the vicinity of an opening in the guide-bore 85. There are provided a plurality of free rollers 81 between the pair of the guides 84 in the upper and lower parts. The film holder 70 is sandwiched between those free rollers 81 from up and down. A driving roller 82 which is rotated by a motor 83 is disposed between the two free rollers 81 in the lower part of the guide-bore. When the film holder 70 is to be inserted or removed, the driving roller 82 is retracted. When the film holder 70 is fitted in, the driving roller 82 is pressed in contact with the film holder 70. The film holder 70 is moved in a direction of an arrow by the rotation of the driving roller 82, thereby scanning the image of the film. It is possible to select the other frame from the same film. It also is possible to move the film holder 70 backward by reversely rotating the motor 83, and as a result, a full-colored image can be scanned plural times. Since the film is scanned by moving the film holder 70, even and stable scanning can be performed with great accuracy.

The projecting lens 46 of the projector 6 is moved back and forth in a direction of the optical axis by the motor 45. This back-and-forth reciprocal movement effects focusing of the projected image as will be described later.

A rectangular opening 8 is formed in the left side of the document platen 2 on the upper surface of the main body 1. The opening 8 has a longer side substantially equal to the depth of the document platen 2 and a shorter side slightly longer than the width of the lens 32 in the sub-scanning direction. A Fresnel lens 10 is fitted in the opening 8 so as to seal the opening. A screen surface is provided in the lower surface of the Fresnel lens 10. A mirror cover 11 is installed in the opening 8. The mirror cover 11 has its side edge pivotally supported to the main body 1, whereby the mirror cover 11 is openable toward the left side of the opening 8. On the lower surface of the mirror cover 11 is fitted a mirror 9 having generally the same shape and size as those of the Fresnel lens 10. If the mirror cover 11 is retained in the state with an inclination of about 45 degrees with respect to the upper surface of the main body 1, the image of the projected light irradiated from the projector 6 is reflected by the mirror cover 11 to be incident on the Fresnel lens 10. When the image of the film is not to be read, the mirror cover 11 is closed and the mirror 9 is housed in the opening 8. Accordingly, when the image of the film is normally read, those members are out of the way of the operator's work, similarly to the projector 6. Those members can easily be set when the image of the film is to be read. Since the mirror cover 11 is attached so as to be at right angles in its lengthwise direction to the optical axis, the projected image is not shifted with respect to the optical axis and the distortion of the projected image is never liable to be brought about.

When the image of the film is to be read, the reading head 3 is moved below the opening 8 and is fixed at a position where the incident side of the lens 32 is faced to the screen surface of the Fresnel lens 10. The reading head 3 reads the image of the film at this position. However, the position where the image of the film is read is not necessarily restricted to this position. If the position of reading the image of the film is set below the document platen 2, it is unfavorably necessary to place a mirror and the like on the document platen as in the conventional apparatus. In this case, there is a disadvantage that a light quantity for reading the image of the film is lost because the light passes through a glass plate. As may be seen, the preferred embodiment of the invention is desirable since the apparatus has a position for reading the image of the film set below the specifically-aimed opening.

An optical path of the projecting light from the projector 6 through the mirror 9 to the Fresnel lens 10 will now be described below.

Figure 7:
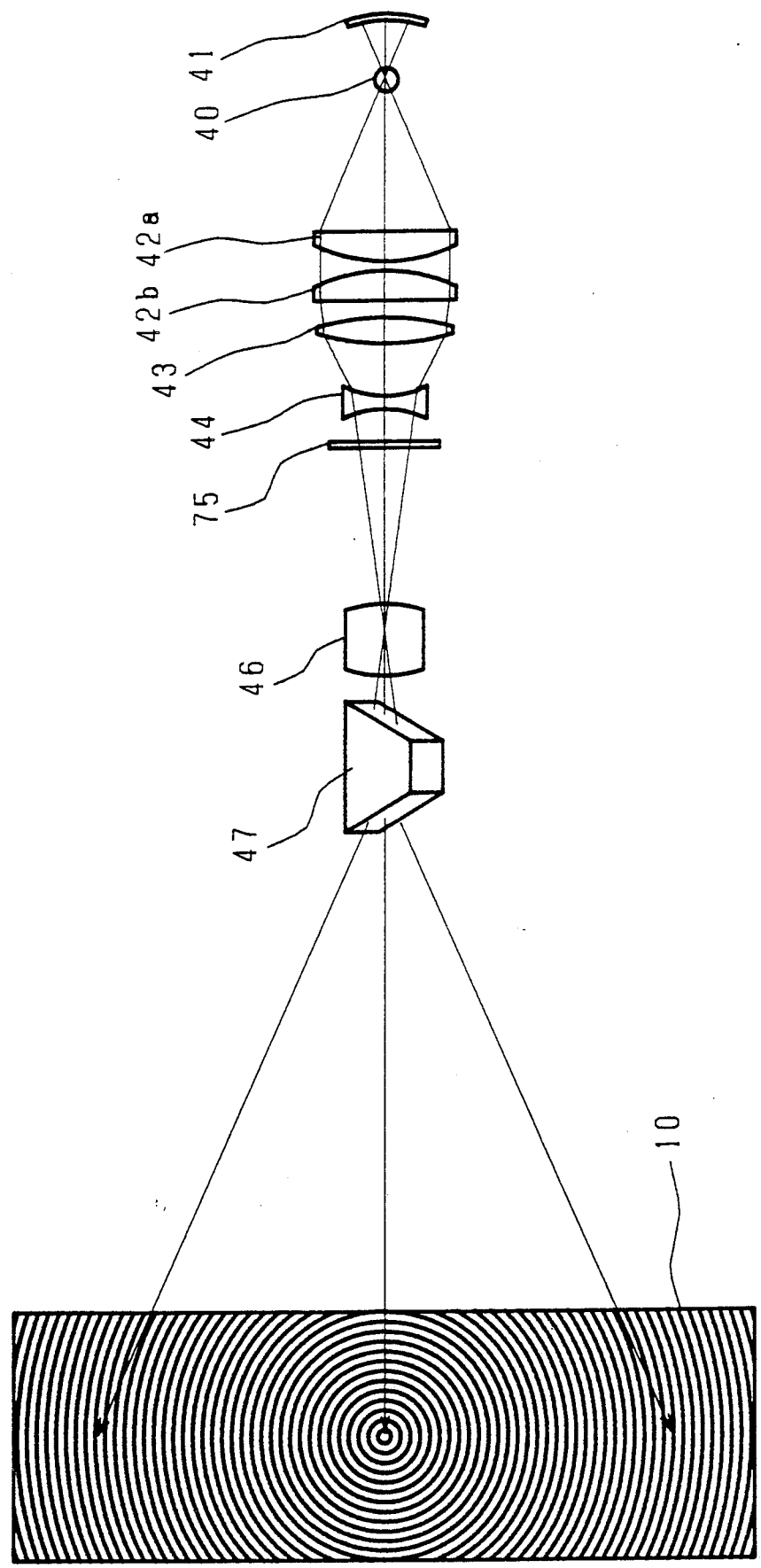
FIGS. 7 and 8 are a plan view and a side elevational view showing an optical path of projecting light, respectively.
Figure 8:
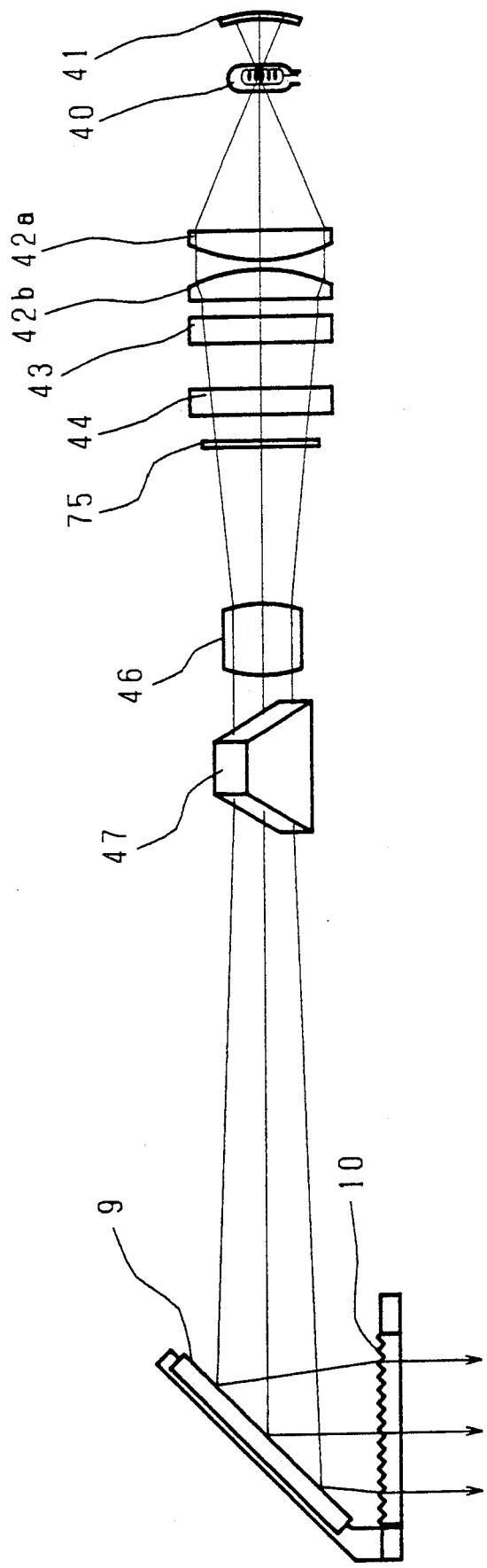

FIG. 7 is a plan view showing the optical path and FIG. 8 is a side elevational view thereof. An illuminating system used in the projector 6 is Koehler illuminating system. The image of the light source 40 is produced in the pupil of the projecting lens 46. A filament image of the light source 40 is never produced on the screen surface of the Fresnel lens 10, thereby enabling utilization of all the luminous flux moving from the light source 40 to the projecting lens 46.

Light emitted from the light source 40 is led to the condenser lens 42a, 42b. At this time, also the light moving toward the opposite direction to a film 75 is condensed in the vicinity of the light source 40 by a reflecting mirror 41 and is led to the condenser lens 42a, 42b. As a result, the light emitted from the light source 40 can effectively be used. The luminous flux condensed in the condenser lenses 42a, 42b is then condensed to be in the form of a narrow rectangular strip through the cylindrical lenses 43, 44 which change the length and breadth ratio of the luminous flux. The luminous flux penetrates the film 75, creating the image of the light source 40 in a vertically narrow shape on the pupil of the projecting lens 46. The cylindrical lenses 43, 44 are disposed so that the rectangular strip of illumination can be obtained in the total widthwise direction in a part of the longitudinal film 75. The vertically long image of the film after irradiated from the projecting lens 46 is rotated by 90 degrees by the image rotating prism 47 and is enlarged to be a horizontally long image, which is then reflected by the mirror 9, reaching the Fresnel lens 10. Diffused luminous flux is condensed substantially in a horizontal direction by the Fresnel lens 10. The strip of the optical image of the film is enlarged and projected on the screen surface of the Fresnel lens 10. The lengthwise direction of the optical image of the film is equal to the lengthwise direction of the screen surface.

The film 75 is arranged to be illuminated in strips for such reasons as described below. The apparatus of the present invention performs scanning by moving the film 75 with stationarily holding the reading head 3. There is accordingly no need to illuminate the film in the same way as in projecting the whole image of a frame of the film. In addition, there is essentially no need to have a wide illumination in the horizontal direction because the apparatus of the invention necessitates only illumination in the direction corresponding to the main-scanning direction of the image sensor 33 including the optical axis, that is, in the direction vertical to the film surface fitted in the film holder. When a light source having the same luminous intensity as the light source 40 is used, if illuminating light from the light source is condensed to be a strip, it becomes possible to enhance the illumination intensity on the screen surface in comparison with the conventional case where the whole image is projected. It is possible to secure illumination enough for smooth reading even if the luminous intensity of the light source 40 is reduced to be smaller than that of the light source of the prior art. As a result, the apparatus of the invention is advantageous in that the consumption of electricity can be restricted as compared with the prior art. Conventionally, unevenness of light quantity from the light source produces a difference in illumination between the center and the peripheral portion of the projected image, resulting in compulsory or inevitable compensation of the illuminating light by the image sensor in the main-scanning direction and in the subscanning direction, respectively. On the contrary, the apparatus of the invention reads the image of the film with the image sensor being stationary, and therefore, while the optical axis of the illuminating light is constantly incident on the image sensor, the film is moved in a direction orthogonal to the optical axis. As a result, even if the projected area is changed by moving the film, the illumination in the center of a strip of the projected image of the film always corresponds to that of the center of the whole projected image in the prior art. The image sensor has no need for compensation in the moving direction of the film, i.e., in the subscanning direction, only requiring compensation in the main-scanning direction. In addition, since the projected image is in the form of a strip, it is not necessary to employ such a mirror, a Fresnel lens and a screen surface of large size as in the prior art in order to reflect and project the image. These optical members will be rendered compact in size.

In the above-described embodiment of the invention, the cylindrical lenses 43, 44 are used for condensing illumination light to be a strip pattern, but, a linear Fresnel lens may be applied for it. In the instant embodiment, although the Fresnel lens 10 is used for leading the projected image to the image sensor 33, since the projected image has a strip pattern, a lens made of a convex lens cut into a rectangular shape may be used.

In order to read the image of the film 75 with high accuracy, it is necessary to precisely focus the projected image. It may be possible to focus the image of the film by moving the projecting lens 46 while the operator is watching the projected image, which is, however, considerably troublesome for the operator. Therefore, in the apparatus of the invention, focusing of the projected image is carried out by applying AF with the use of the motor 45.

Figure 9:
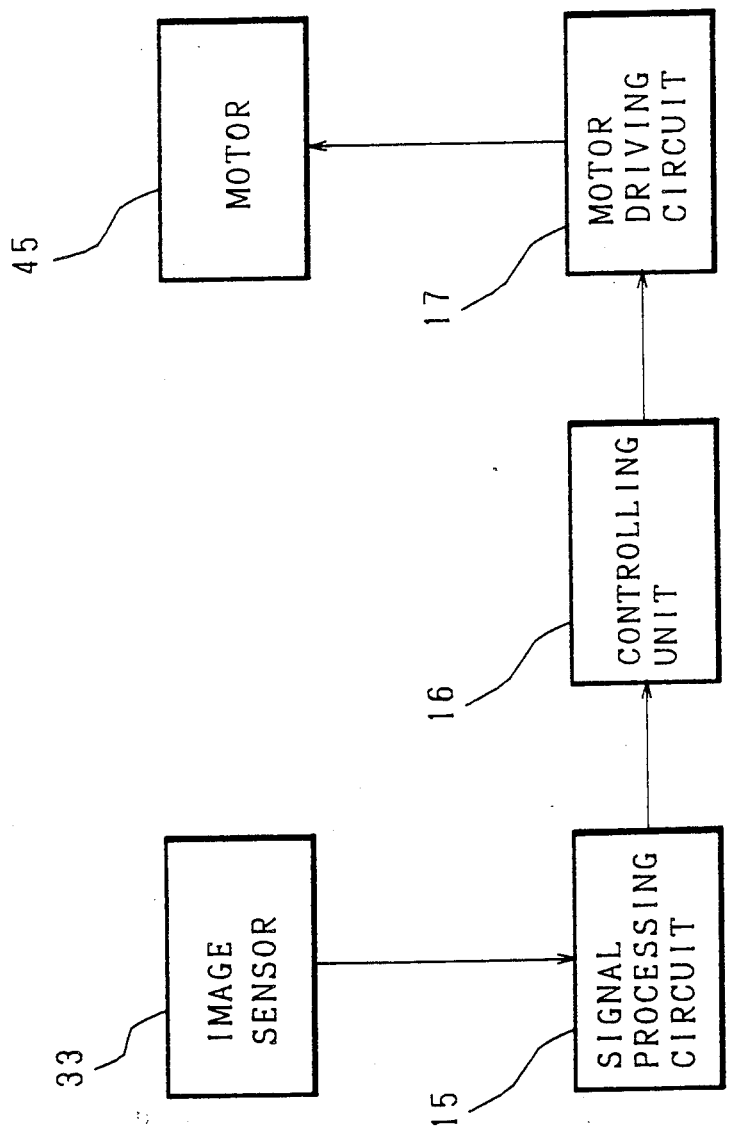
FIG. 9 is a block diagram of a controlling system for focusing a projected image by AF (auto focusing)

FIG. 9 is a block diagram showing the structure of the control system of the apparatus of the preferred embodiment of the invention. An output from the image sensor 33 is input to an input port of a controlling unit 16 composed of a microprocessor through a signal processing circuit 15. An output port of the controlling unit 16 is connected to a motor driving circuit 17 which is connected to the motor 45.

Figure 5:
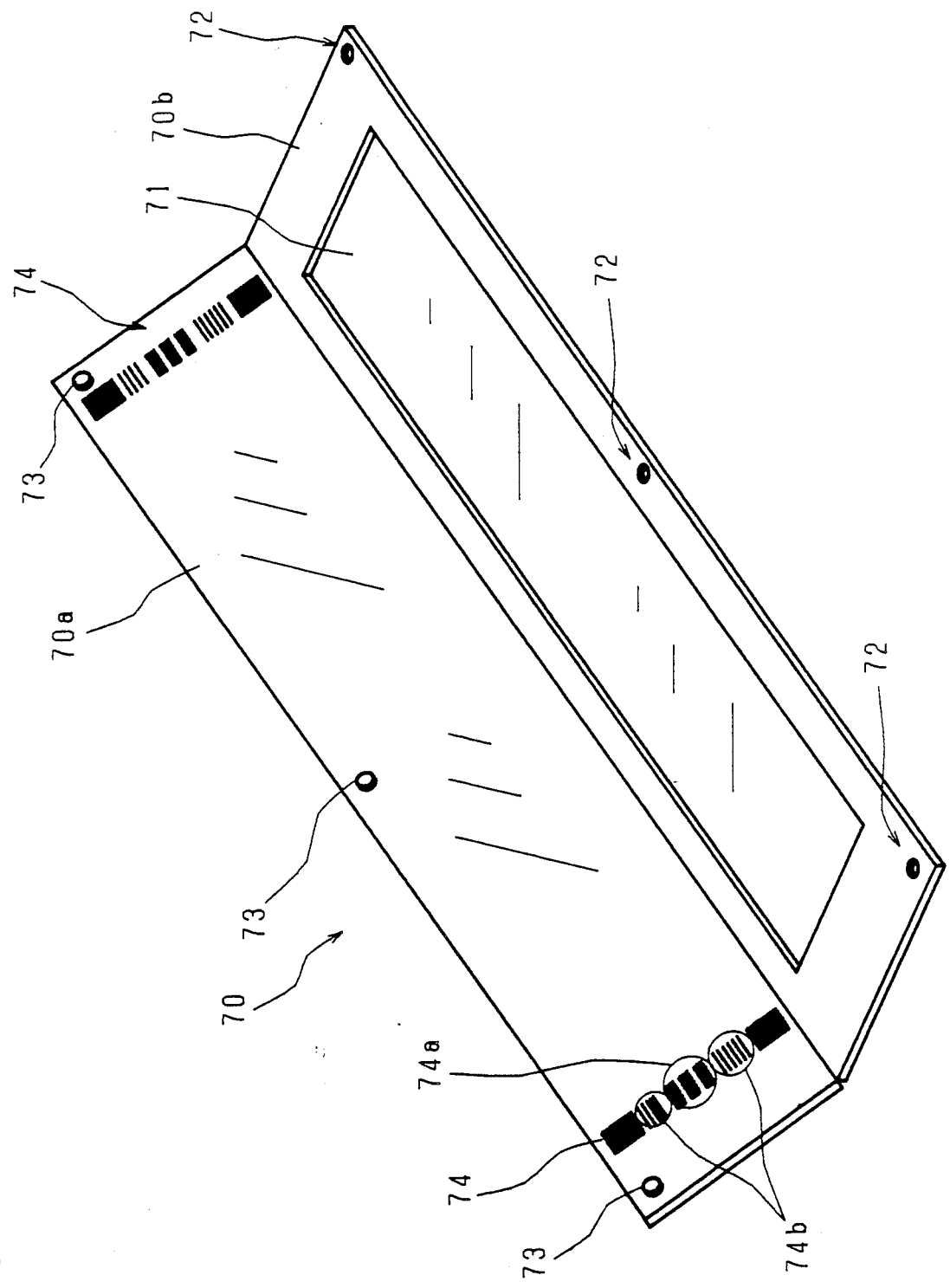
FIG. 5 is a perspective exterior view of a film holder.

The image sensor 33 detects the contrast from its detecting signal while using a pattern 74 formed in the film holder 70. Focusing is performed by driving the projecting lens 46 on the basis of the detected contrast. The pattern 74 comprises a pattern 74a having a wide pitch for roughly adjusting the focus and a pattern 74b having a narrow pitch for exactly adjusting the focus, both being disposed in parallel relation with each other in the widthwise direction of the film holder 70 (See FIG. 5). Since the lengthwise direction of the strip illumination is the same as the direction in which the patterns 74a, 74b are disposed in parallel relation, generally the whole of the pattern 74 is projected and read by the image sensor 33 at the same time. The reading signal is input to the controlling unit 16. The controlling unit 16 calculates MTF (Modulation Transfer Function) value of the reading signal and outputs to the motor driving circuit 17 a driving signal for moving the projecting lens 46 to the position where the MTF value is maximum. In other words, the controlling unit 16 reads the pattern 74a and moves the projecting lens 46 comparatively far to the position where the MTF value is maximum. The controlling unit 16 then reads the pattern 74b and slightly moves the projecting lens 46 to the position where the MTF value is maximum. The projecting lens 46 is set at this position. The MTF value is maximum when the difference of light which recognizes a black and white pattern between a plurality of ajoining CCDs, i.e., the contrast in the image sensor 33 is at its maximum. Focusing can be performed by moving the projecting lens 46 so that the MTF value is to be at its maximum.

Figure 10:
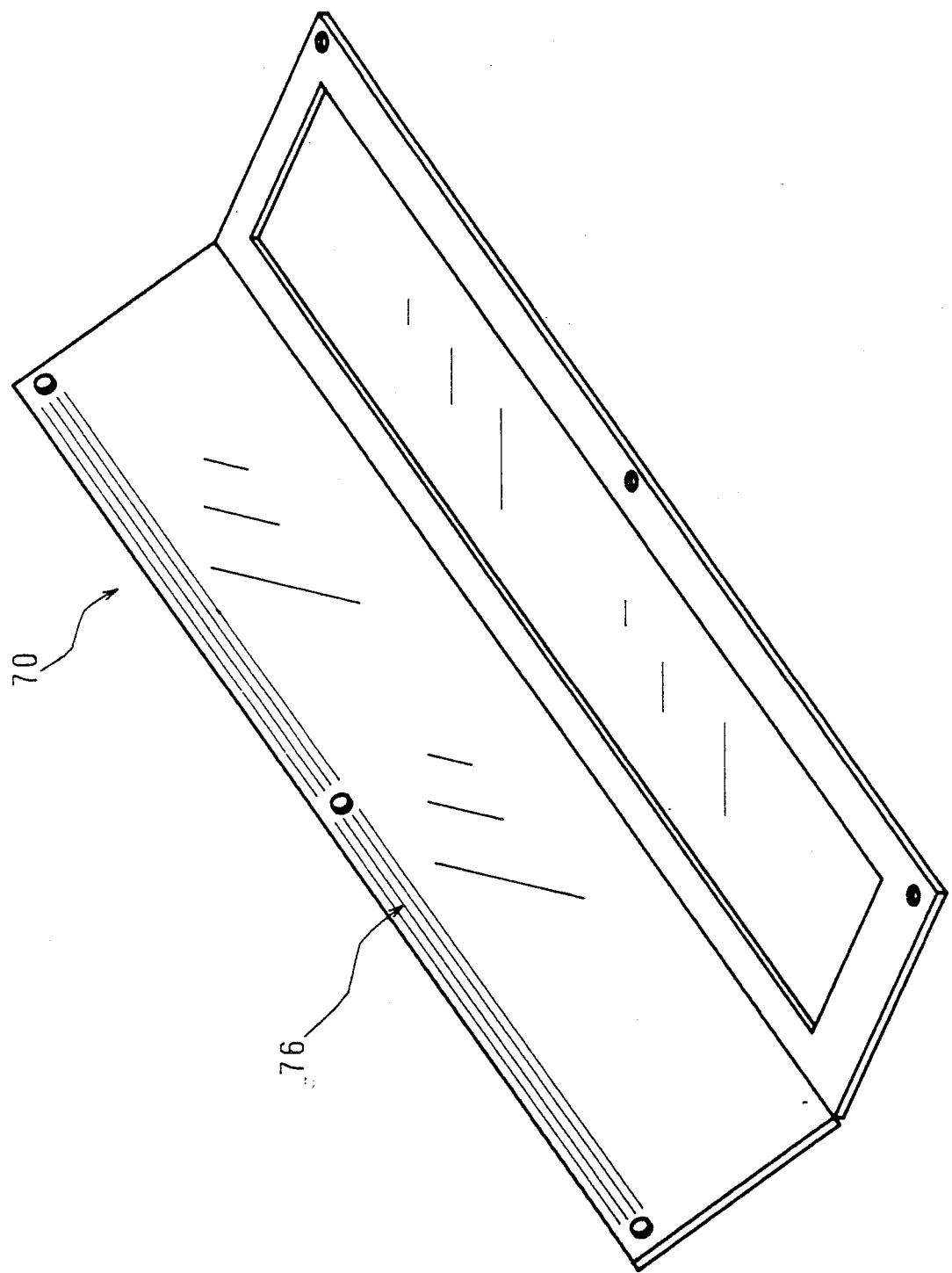
FIG. 10 is a perspective exterior view of a film holder of the second embodiment.

Such focusing with the use of the pattern 74 is normally carried out before reading the image of the film. As shown in FIG. 10, it may be possible to carry out focusing with use of a pattern 76 simultaneously when the image of the film is read. The pattern 76 comprises a plurality of lines having substantially the same length as the film holder 70 and arranged in parallel relation with each other in the widthwise direction of the film holder 70. The pattern 76 is formed at a position closer to the longitudinal side edge of the film holder 70. When the film holder 70 is fitted in the projector 6, the pattern 76 is located at the upper side (or lower side) of the film piece. Together with the image of the film piece to be moved, the pattern 76 is always projected at a position closer to the front (or deep) side on the screen surface. By CCDs located corresponding to the above-described position on the screen surface, focusing is carried out in accordance with the contrast in the manner as described above. The other CCDs of the image sensor 33 naturally perform reading of the image of the film.

Figure 11:
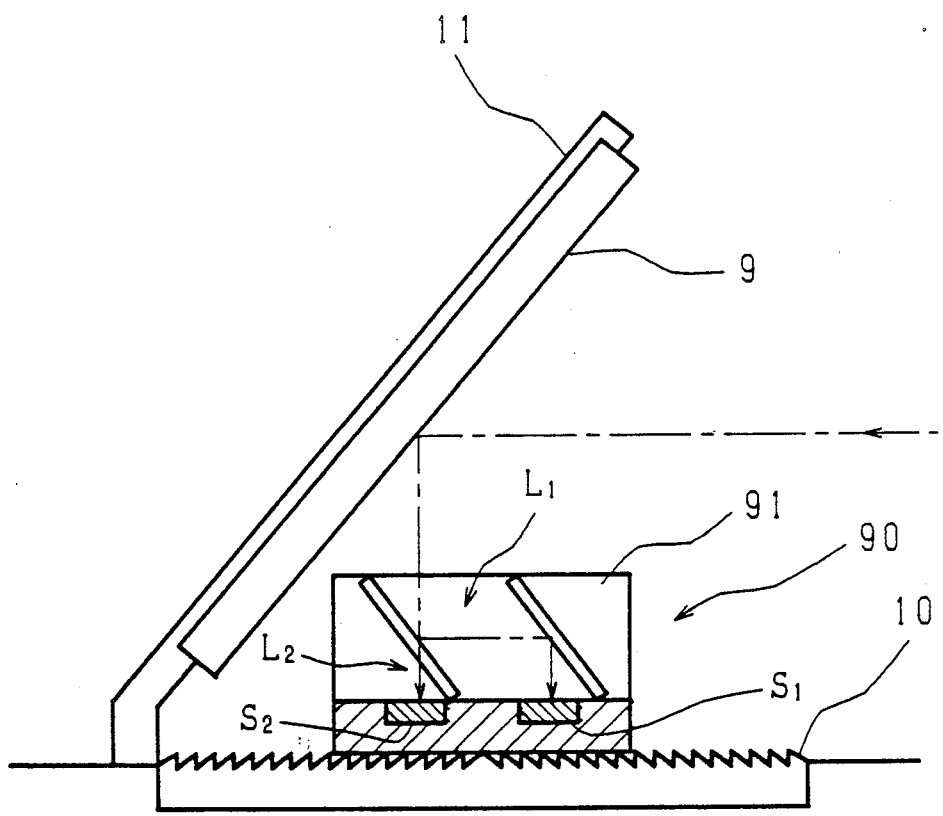
FIG. 11 is a longitudinal sectional view showing a state that a sensor for AF is mounted.

In the above-mentioned example, focusing by AF is performed with the employment of the detecting signal from the image sensor 33. In addition to the above example, it may be possible to perform focusing with the use of a detecting signal outputted from a sensor for AF. FIG. 11 is a longitudinal sectional view showing one example of the sensor for AF mounted over the Fresnel lens 10. The AF sensor 90 includes in the lower part thereof sensors $S_1$, $S_2$ each composed of a CCD line sensor. The lengthwise direction of each of the sensors $S_1$, $S_2$ agrees with that of the image sensor 33, and, the sensors, $S_1$, $S_2$ are spaced a suitable distance from each other slightly above the upper surface of the Fresnel lens 10. A beam splitter 91 is disposed above the sensors $S_1$, $S_2$. Projecting luminous flux emitted from the projector 6 goes through the beam splitter 91 to the sensors $S_1$, $S_2$. At this time the length $L_1$ of the optical path from the projector 6 to the sensor $S_1$ is different from the length $L_2$ of the optical path from the projector 6 to the sensor $S_2$. To be concrete, assuming that the length of the optical path from the projector 6 to the screen surface of the Fresnel lens 10, namely, to the surface where the focus is met is l, there are established such formulas as:

$$L_2 < L < L_1,$$

and $$L_1 - L = L - L_2.$$

In other words, in the optical path, the sensor $S_1$ is located behind the screen surface and the sensor $S_2$ is located before the screen surface, and moreover the length of the optical path from the screen surface to each sensor $S_1$, $S_2$ is the same. If the image is focused at the position before (or behind) the screen surface, the output value of the sensor $S_2$ (or sensor $S_1$) is higher than that of the sensor $S_1$ (or sensor $S_2$). If the image is focused on the screen surface, the output value of the sensor $S_1$ is the same as that of the sensor $S_2$. Auto focusing is carried out by applying such relation as described above.

Figure 12:
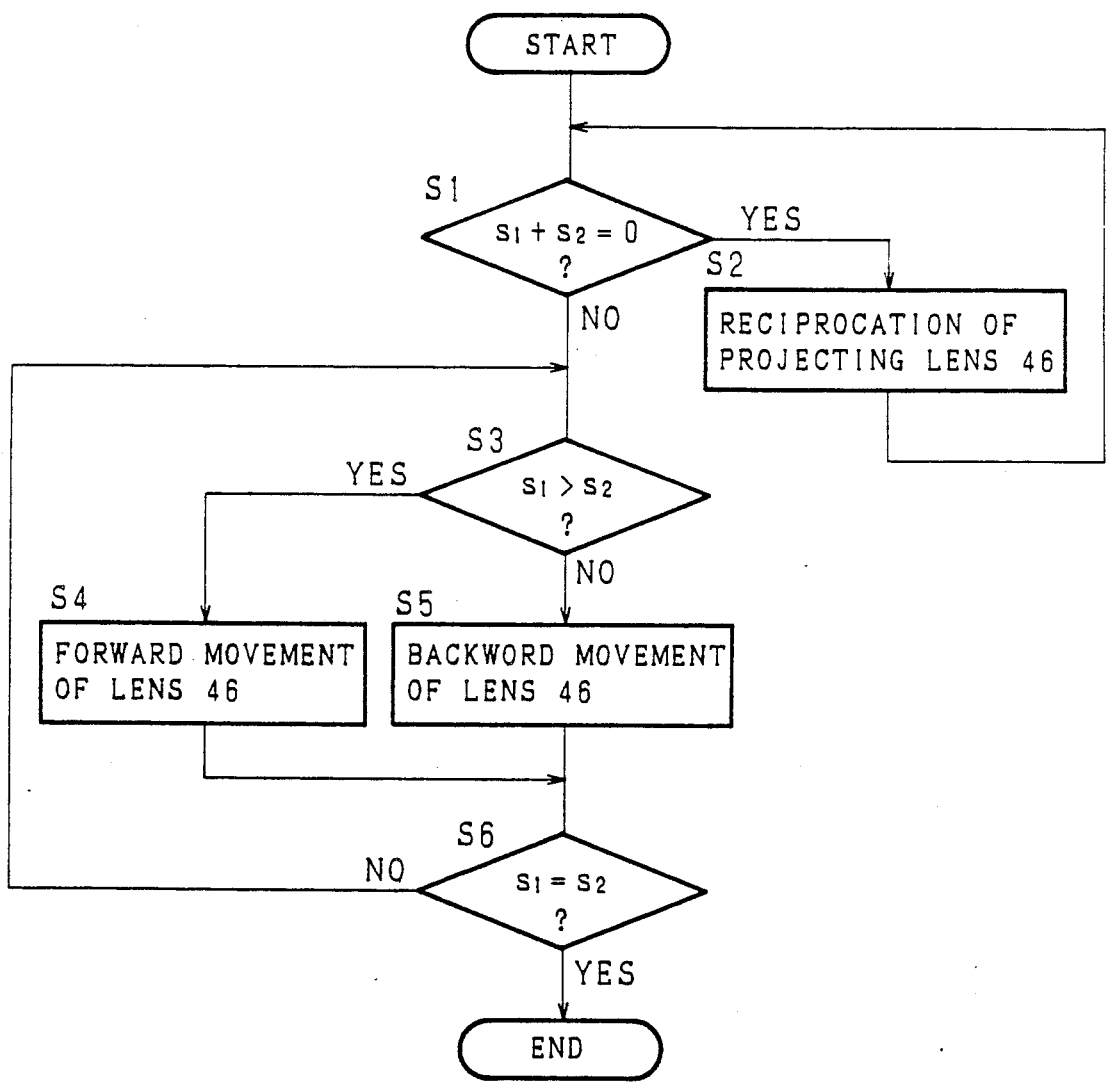
FIG. 12 is a flow chart showing a procedure of AF operation.

FIG. 12 is a flow chart showing a procedure of AF operation. Assuming that an output value of the sensor $S_1$ is $s_1$ and an output value of the sensor $S_2$ is $s_2$, it is detected first whether $s_1 + s_2$ is zero (Step S1). In the case where $s_1 + s_2$ is zero, since the focused point is located far from the screen surface, the projecting lens 46 is greatly moved back and forth so as to obtain the output value (Step S2). After the output value is obtained, the value $s_1$ is compared with the value $s_2$ (Step S3). If $s_1 > s_2$ is established, or in the case where the focused point is behind the screen surface, the projecting lens 46 is moved forward by predetermined distances (Step S4). In the case of $s_1 < s_2$, or in the case where the focused point is before the screen surface, the projecting lens 46 is moved backward by predetermined distances (Step S5). Operations of steps S4, S5 are repeated until the formula : $s_1 = s_2$ is obtained. When the formula is obtained (Step S6), it is detected that the image is focused on the screen surface, thereby to finish the AF operation.

When the image of the film is read after the AF operation is finished, the AF sensor 90 is detached from the Fresnel lens 10. It may be possible that the AF sensor 90 is automatically installed or retracted in cooperative movement with the AF operation. It may also be possible to carry out the AF operation by always mounting the AF sensor between the opening 8 and the document platen 2, so that upon necessity, the inclination angles of the mirror cover 11 are changed to form an optical path to the AF sensor.

Figure 13:
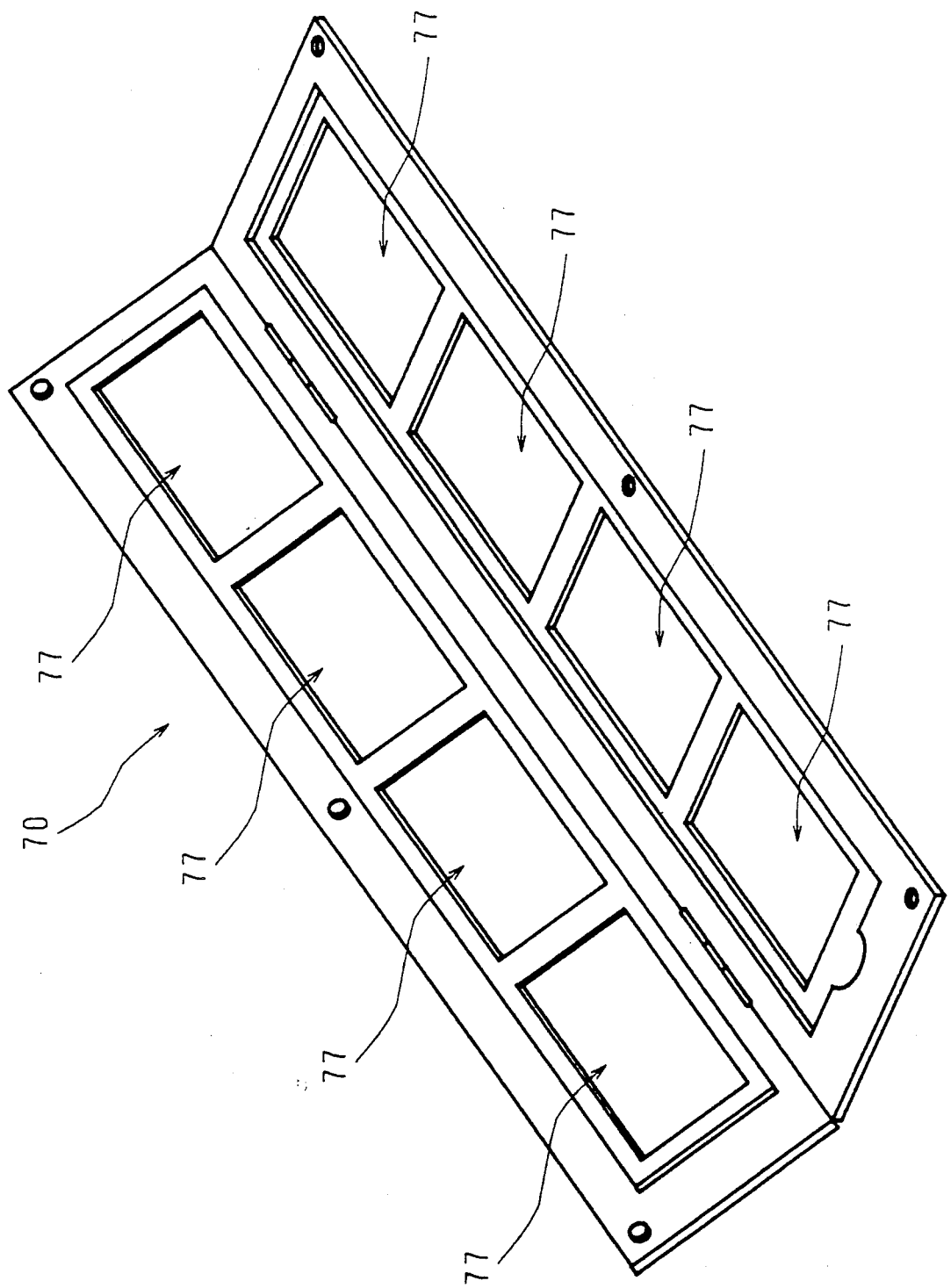
FIG. 13 is a perspective exterior view of a film holder of the third embodiment.

In focusing by the AF operation as described above, the projected image of the pattern formed in the film holder is used. Except for the case where the AF operation is carried out at the same time when the image of the film is read, focusing by the AF operation is not limited to the above-mentioned method. It also is possible to carry out focusing by detecting the contrast from the projected image of the film. In this case, the film holder 70 is utilized as shown in FIG. 13. Two pieces of plate for nipping the film piece have a plurality of openings 77 disposed in parallel corresponding to the size of each frame of the film piece. In such example, it is not necessary that the film holder 70 is traansparent.

One example how the image of the film is read will now be described herein below. First, the mirror cover 11 is opened and set at predetermined angles as shown in FIG. 2. The reading head 3 having the image sensor 33 which has been compensated in the main-scanning direction in advance is moved to a reading position below the opening 8. The projector 6 is set to be in a condition capable of projecting the image. The film holder 70 sustaining the film piece to be read is fitted into the film scanning mechanism 80 of the projector 6. The light source 40 is lit and the pattern 74 of the film holder 70 is projected on the screen surface. This projected image is used for carrying out AF operation and focusing. The film holder 70 is moved so that the starting position of reading a desired frame of the film piece is projected, thereby finishing preparation for reading the image. At this point, the peripheral portion of one end of a frame of the image in the length wise direction of the film piece is enlarged and projected to be a slit. The whole enlarged image of the frame is read by processing the reading signal of the image sensor 33 and moving the film holder 70 by the motor 83 of the film scanning mechanism 80, that is, changing the projecting area in a synchronous manner. At this time, is is not necessary to light the light source 31 of the reading head 3.

Figure 14:
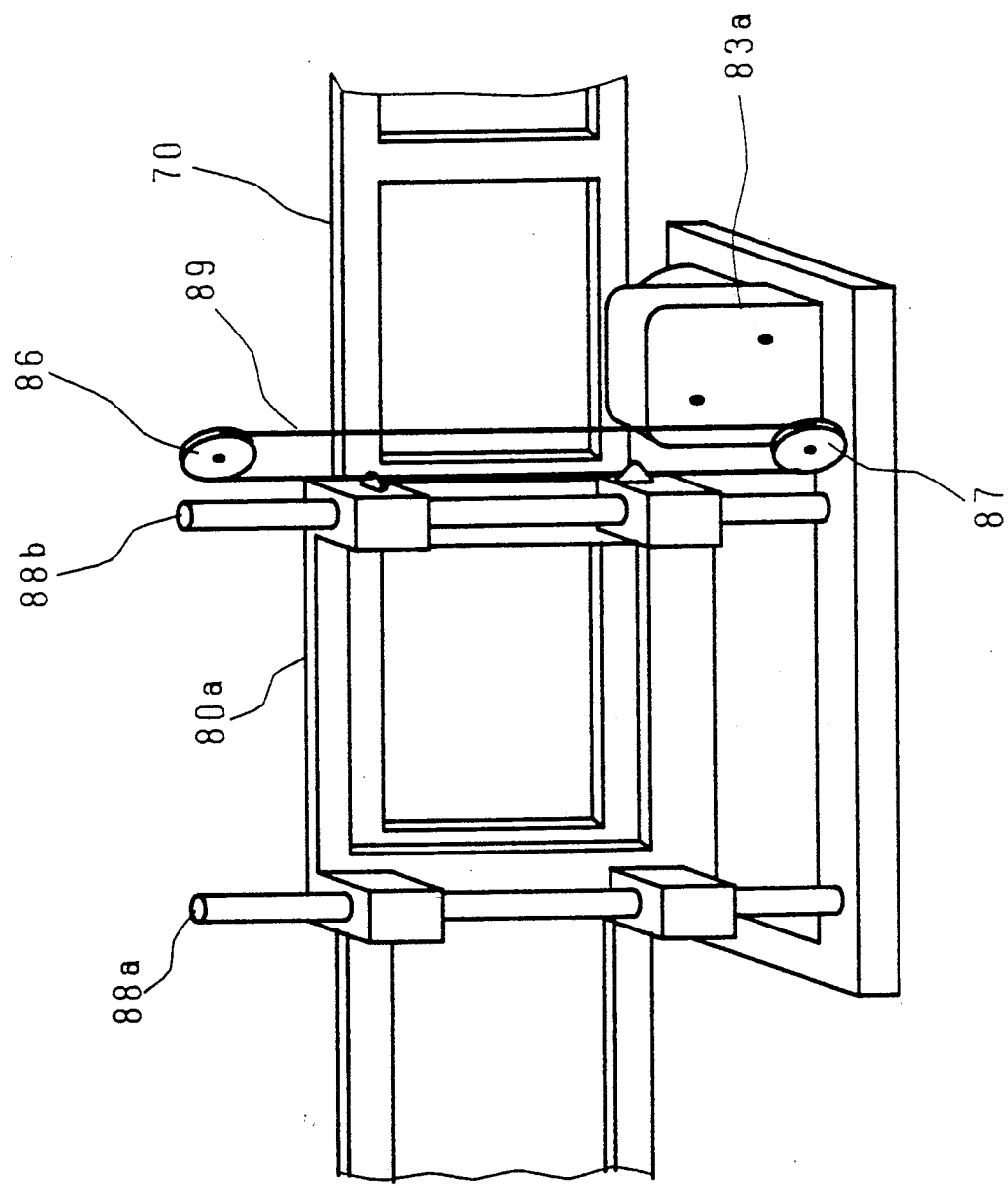
FIG. 14 is a perspective exterior view of a film scanning mechanism of another embodiment.

In the preferred embodiment of the invention, although the moving direction of the film holder 70 is horizontal, the film holder may be moved in the vertical direction. At this time, the lengthwise direction of a strip of an illuminating area with respect to the film is horizontal. As a result, it is not necessary to rotate the projected image by 90 degrees, and the image rotating prism 47 can be disposed with. In this case, when the film holder 70 is fitted into the projector 6, the lengthwise direction of the film holder 70 is vertical. If it is not desirable to have an extra space for the film holder 70 protruding in the vertical direction of the projector 6, it is suitable to provide such a film scanning mechanism as shown in FIG. 14. The film scanning mechanism of FIG. 14 comprises a film-holder supporting member 80a supports the film holder 70. The supporting member 80a supports the film holder 70 in such manner that the lengthwise direction of the film holder becomes horizontal. The supporting member 80a pivotally supported in the vertical direction by means of guide shafts 88a, 88b is moved in the vertical direction along the guide shafts 88a, 88b. This movement of the supporting member 80a is performed by pulleys 86, 87 which are rotated and driven by a motor 83a and by a wire 89 which is neatly coiled up around the pulleys. In the above-described example of the invention, the film holder 70 is moved and scanned in the vertical direction in the state where the lengthwise direction thereof is set to be horizontal.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is

1. An image reading apparatus comprising: a document platen for supporting a document sheet thereon;
   reading means including a line image sensor which moves in a subscanning direction in order to scan an image of the document sheet on said document platen;
   a projector and a projecting lens for projecting an optical image of a film onto said line image sensor;
   means for positioning said image sensor at a predetermined position when the image of the film is read;
   supporting means for supporting the film;
   means for sequentially scanning strips of the optical image of the film by moving the film with respect to said line image sensor when the image of the film is read and while said line image sensor is at said predetermined position.

2. An image reading apparatus as claimed in claim 1, wherein said supporting means includes a supporting portion and a film holder detachably attached to said supporting portion.

3. An image reading apparatus as claimed in claim 1, further comprising a means for adjusting the position of said projecting lens in order to automatically focus the optical image of the film on said line image sensor.

4. An image reading apparatus as claimed in claim 3, wherein said line image sensor comprises a plurality of CCD (charge coupled device), and the optical image of the film is automatically focused in accordance with outputs of two adjoining CCDs.

5. An image reading apparatus as claimed in claim 3, wherein said scanning means includes a light-permeable film holder holding the film and having a black and white pattern on the surface thereof, whereby the optical image of the film is automatically focused by the use of said black and white pattern.

6. An image reading apparatus as claimed in claim 5, wherein reading of the image of the film and automatic focusing of the optical image of the film are simultaneously carried out.

7. An image reading apparatus as claimed in claim 1, wherein said scanning means moves the film in a horizontal direction.

8. An image reading apparatus as claimed in claim 1, wherein said projector is movable between an operating position where the projector is located in the vicinity of said document platen and a non-operating position where the projector is located away from said document platen.

9. An image reading apparatus comprising:
   a document platen for supporting a document sheet thereon;
   reading means including a line image sensor which moves in a subscanning direction in order to scan an image of the document sheet on said document platen; and
   a projector for projecting an optical image of a film onto the line image sensor located at a predetermined positions with respect to the subscanning direction thereof when the image of the film is read, said projector including a supporting means for supporting the film, a moving means for moving the film in the lengthwise direction of said line image sensor, and an optical means for optically rotating the optical image of the film moved by said moving means and for projecting the rotated optical image on said line image sensor so that the optical image of the film moves on the line image sensor in a direction perpendicular to the lengthwise direction of said line image sensor.

10. An image reading apparatus as claimed in claim 9, wherein said supporting means includes a supporting portion and a film holder detachably attached to said supporting portion.

11. An image reading apparatus as claimed in claim 9, wherein said optical means includes a projecting lens for projecting the optical image of the film on said line image sensor,
    further comprising a means for adjusting the position of said projecting lens in order to automatically focus the optical image of the film on said line image sensor.

12. An image reading apparatus as claimed in claim 9, wherein said projector is movable between an operating position where the projector is located in the vicinity of said document platen and a non-operating position where the projector is located away from said document platen.

13. An image reading apparatus comprising:
    a document platen for supporting a document sheet thereon;
    reading means disposed below said document platen for electrically reading an image of the document sheet on said document platen, said reading means including a line image sensor moving in a subscanning direction;
    an opening disposed in the vicinity of the document platen and extending in the lengthwise direction of said line image sensor;
    a projector for projecting an optical image of a film, said projector including supporting means for supporting the film, a light source for illuminating the film, moving means for moving the film with respect to said line image sensor in order to scan the image of the film, and a projecting lens for projecting the scanned optical image of the film; and
    a reflecting mirror located in the vicinity of said opening, extending in the lengthwise direction of said line image sensor, and movable between an operating position where said reflecting mirror reflects the light from said projector through said opening toward said line image sensor located below said opening when the image of the film is read and non-operating position where said reflecting mirror covers said opening.

14. An image reading apparatus as claimed in claim 13, wherein said projector is movable between a first position where the projector is positioned above a main body of the image reading apparatus for projecting operation and a second position where the projector is positioned in a lateral side of the main body of the image reading apparatus.

15. An image reading apparatus comprising:
an image sensor;
a document platen on which a document sheet is placed;
first moving means for moving said image sensor in order to scan an image of the document sheet placed on said document platen when the image of the document sheet is read;
supporting means for supporting a film;
second moving means for moving the film in order to scan an image of the film supported by said supporting means when the image of the film is read;
means for positioning said image sensor in a fixed manner at a predetermined locataion when the image of the film is read; and
projecting means for projecting the image of the film onto said image sensor positioned at said predetermined location.

16. An image reading apparatus comprising:
a document platen for supporting a document sheet thereon;
reading means including a line image sensor which moves in a subscanning direction in order to scan an image of the document sheet on said document platen;
a projector for projecting an optical image of a film on said line image sensor located at a predetermined position with respect to the subscanning direction thereof when the image of the film is read;
supporting means for supporting the film;
moving means for moving the film with respect to said line image sensor in order to scan the image of the film;
a projecting lens for projecting the scanned optical image of the film;
means for adjusting the position of said projecting lens in order to automatically focus the optical image of the film on said line image sensor;
wherein said moving means includes a light-permeable film holder holding the film and having a black and white pattern on the surface thereof, whereby the optical image of the film is automatically focused by the use of said black and white pattern.

* * * * *